United States Patent
Daley et al.

(10) Patent No.: US 12,406,271 B2
(45) Date of Patent: Sep. 2, 2025

(54) IDENTITY PROOFING FOR ONLINE ACCOUNTS

(71) Applicant: INTERNATIONAL BUSINESS MACHINES CORPORATION, Armonk, NY (US)

(72) Inventors: Stan Kevin Daley, Atlanta, GA (US); Michael Bender, Rye Brook, NY (US); Subhankar Sarkar, Rancho Santa Margarita, CA (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/250,251

(22) Filed: Jan. 17, 2019

(65) Prior Publication Data

US 2020/0234310 A1    Jul. 23, 2020

(51) Int. Cl.
*G06Q 30/018* (2023.01)
*H04L 9/40* (2022.01)

(52) U.S. Cl.
CPC ......... *G06Q 30/0185* (2013.01); *H04L 63/08* (2013.01)

(58) Field of Classification Search
CPC ...... H04L 63/08; G06Q 30/0185; G06F 21/31
See application file for complete search history.

(56) References Cited

U.S. PATENT DOCUMENTS

| | | | |
|---|---|---|---|
| 8,424,061 B2 | 4/2013 | Rosenoer | |
| 8,847,733 B2 | 9/2014 | Khan et al. | |
| 8,918,904 B2 | 12/2014 | Sanin et al. | |
| 9,325,715 B1 | 4/2016 | Chereshnev et al. | |
| 9,830,450 B2 | 11/2017 | Jou et al. | |
| 9,900,309 B2 | 2/2018 | Toth | |
| 10,127,378 B2 | 11/2018 | Toth | |
| 2005/0097320 A1* | 5/2005 | Golan | G06F 21/40 713/166 |
| 2012/0109834 A1 | 5/2012 | Bongiovanni et al. | |
| 2016/0005050 A1* | 1/2016 | Teman | G06Q 30/018 705/317 |
| 2016/0253486 A1* | 9/2016 | Sarkar | G06F 21/316 726/7 |
| 2019/0230092 A1* | 7/2019 | Patel | H04L 63/08 |

(Continued)

FOREIGN PATENT DOCUMENTS

| | | |
|---|---|---|
| EP | 2654264 | 10/2013 |
| WO | 2018140860 | 8/2018 |

OTHER PUBLICATIONS

How to Spot a Twitter Bot, https://symantec-enterprise-blogs.security.com/blogs/election-security/spot-twitter-bot (Year: 2018).*

(Continued)

*Primary Examiner* — Aryan E Weisenfeld
(74) *Attorney, Agent, or Firm* — Rakesh Roy; Andrew D. Wright; Calderon Safran & Wright P.C.

(57) ABSTRACT

A computer-implemented method includes: receiving, by a computer device, a request for a new online account for accessing data stored in an enterprise system; determining, by the computer device, an identity associated with the request; determining, by the computer device, a risk score for the request; determining, by the computer device, validation steps based on the risk score; and executing, by the computer device, the validation steps.

20 Claims, 4 Drawing Sheets

(56) References Cited

U.S. PATENT DOCUMENTS

2019/0251234 A1* 8/2019 Liu .................... G06F 21/31

OTHER PUBLICATIONS

Wani, A sneak into the Devil's Colony—Fake Profiles in Online Social Networks, https://arxiv.org/ftp/arxiv/papers/1705/1705.09929.pdf (Year: 2017).*
Preuveneers et al., "SmartAuth: dynamic context fingerprinting for continuous user authentication," Proceedings of the 30th Annual ACM Symposium on Applied Computing (SAC '15), 2015, 7 pages.
Burr et al., "Electronic Authentication Guideline", NIST Special Publication (SP) 800-63-2, https://nvlpubs.nist.gov/nistpubs/SpecialPublications/NIST.SP.800-63-2.pdf, Aug. 2013, 124 pages.

* cited by examiner

IDENTITY PROOFING FOR ONLINE ACCOUNTS

BACKGROUND

The present invention relates generally to preventing identity theft and, more particularly, to identity proofing a claimant who is requesting a new online account, and continuously monitoring access to existing online accounts based on determined measures of risk.

Online accounts (also referred to self-service accounts) are commonly provided by a service provider to a user who has data stored with the service provider. For example, a user might have a checking account with a bank, and the bank may provide the user with the opportunity to create an online account by which the user can perform certain functions with the data associated with the checking account. Such functions can include online viewing of the balance of the checking account, online viewing of past transactions of the checking account, online performing of transactions of the checking account such as automated bill pay, online funds transfers, etc. An online account for a checking account is but one example, and there are many other types of online accounts including online accounts to access credit card data, online accounts to access retirement account data, online accounts to access driver's license data, and online accounts to access health and human services data, to name but a few.

When creating a new online account at the request of a user, it is common to perform some amount of verification that the user is legitimately associated with the data that they are requesting access to. For example, when creating a new online account for a user who is requesting online access to a checking account, it is common to obtain information from the requesting user to determine that the requesting user is entitled to access the checking account. One method of validating the identity of a requesting user is to require the user to physically visit an office of the service provider and provide information (such as a driver's license) during the visit. Another method of validating the identity of a requesting user is to require the user to provide the checking account number and their name, social security number, date of birth, and mailing address via an online portal.

SUMMARY

In a first aspect of the invention, there is a computer-implemented method including: receiving, by a computer device, a request for a new online account for accessing data stored in an enterprise system; determining, by the computer device, an identity associated with the request; determining, by the computer device, a risk score for the request; determining, by the computer device, validation steps based on the risk score; and executing, by the computer device, the validation steps.

In another aspect of the invention, there is a computer program product including a computer readable storage medium having program instructions embodied therewith. The program instructions are executable by a computer device to cause the computer device to: receive a request for a new online account for accessing data stored in an enterprise system; determine an identity associated with the request; determine a risk score for the request, wherein the risk score comprises an overall risk score that is determined based on an initial risk score associated with the request and one or more risk criteria associated with the request; determine validation steps based on the risk score; and execute the validation steps.

In another aspect of the invention, there is system including a processor, a computer readable memory, and a computer readable storage medium. The system includes: program instructions to receive a request for a new online account for accessing data stored in an enterprise system; program instructions to determine an identity associated with the request; program instructions to determine a risk score for the request, wherein the risk score comprises an overall risk score that is determined based on an initial risk score associated with the request and one or more risk criteria associated with the request; program instructions to determine validation steps based on the risk score; and program instructions to execute the validation steps. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to preventing identity theft and, more particularly, to identity proofing a claimant who is requesting a new online account, and continuously monitoring access to existing online accounts based on determined measures of risk. According to aspects of the invention, when a claimant requests a new online account, the system determines an identity of the claimant, determines a risk associated with the request, determines validation questions based on the determined risk, and executes the validation questions. In this manner, implementations of the invention provide an improved method of determining whether a new online account should be created for a claimant requesting the account.

In embodiments, the system determines the risk based on predefined risk criteria. In embodiments, the system determines the validation questions using data stored in one or more backend systems associated with the determined identity. In embodiments, the system creates the new online account for the claimant based on the claimant successfully answering the validation questions. On the other hand, if the claimant does not successfully answer the validation questions, then the system asks for additional validation and denies the new online account until such time as the additional validation is provided.

In additional embodiments, the system uses machine learning to modify (i.e., optimize) the algorithms that are used in determining the validation questions. In some embodiments, after creating a new online account, the system continuously monitors access to the online account and determines and presents new validation questions when a newly determined risk score increases an amount from an initially determined risk score.

A problem in today's electronic world is providing digital credentials (e.g., of an online account) to an individual to access information about their data that is stored by a service provider. When the data exists prior to the request for an individual to gain access to the data, it is important to validate that only the correct person has access to the data. Without such controls, other individuals can enter transactions or see information that they are not entitled to see. To compound this problem, after digital credentials (e.g., of an online account) are provided, there is not a process to continuously validate that the credentials were provided to the correct individual. Aspects of the invention address this problem by managing the credential access to an online account throughout the lifecycle of the online account via: providing a single access point to one or more related systems; calculating the steps required to gain access to the account based on the risk of improper access; and performing continual risk calculation of the account based on direct and indirect interactions with the system.

According to aspects of the invention, there is a system and method of determining whether a request for access to a system (e.g., an online account to access data stored by a service provider) should be granted. In this manner, implementations of the invention are useful in preventing identity theft. In embodiments, the method includes: resolving the requester's identity; identifying the system(s) to which access is being requested; determining risk associated with the request being a valid/invalid request; determining validation steps for the request based on evaluation of stored information to determine the current risk; executing the validation steps; creating the online account and sharing credential information when the requester satisfies the validation steps; and continuously performing risk estimation and mediation after creating the new online account.

An exemplary use case is provided to illustrate aspects of the invention. A problem for public sector Health and Human Services enterprises is how to provide secure digital channels (e.g., online accounts) for customers to access data in enterprise systems. Consider, for example, a Health and Human Services agency that is part of a state government agency, which seeks to enable its customers to review their information stored in the state systems, and update such information. A typical update is for the customer to be able to use an online account to change their address in the system when the customer moves from one mailing address to another. The agency typically accomplishes this by providing the customer an online account (also referred to herein as a self-service account), which allows the customer access to their data that is stored with the agency. The online account must therefore be tied to the customer's information footprint in some way. But even before that, the first thing the agency must do is verify the customer's identity. Most commonly, the agency engages a third-party identity proofing service, such as a credit bureau, which verifies the customer identity through their financial footprint. There are two problems with this approach. First, this approach costs money, since the agency pays for the service provided by the third-party identity proofing service. Second, in some domains, e.g. Health and Human Services, customers may not have enough of a financial footprint to support identity verification.

Another way that the agency may attempt to validate the customer's identity in this exemplary use case is to require the customer to physically visit an office to present physical proof of identity. For example, the agency may require the customer to visit a store front and present identifying documents (e.g., driver's license, etc.) before creating the new online account for the customer. While this approach accomplishes the task, it is not efficient for either the customer or the agency.

Another way that the agency may attempt to validate the customer's identity in this exemplary use case is to require the customer to successfully provide unique identifying information such as name, social security number, date of birth, address, etc. This verification is often limited and static, and not proportionate to the risk associated with the identity claim.

Still referring to the exemplary use case, the provisioning of self-service access in this domain typically must comply with privacy rules and/or regulations (e.g., the Health Insurance Portability and Accountability Act, referred to as HIPAA), which require that one customer not be granted access to another customer's data. This acts as a barrier in situations where a single customer's data is stored in plural different agency systems (e.g., department of motor vehicles, health and human services, etc.), where these systems do not use the same customer identifier. As a result, conventional techniques provide self-service access to a single back end system, but do not adequately support a unified portal that provides self-service access to an entire portfolio of backend systems. Such conventional techniques therefore do not adequately support the emerging trend of unified portals or 'No Wrong Door', where the agency seeks to provide the customer a single self-service entry point for programs and services managed in multiple backend systems.

Embodiments of the invention address these shortcomings by providing an improved method of determining whether a new online account should be created for a requester (e.g., a claimant), and by evaluating risks throughout the lifecycle of the account. Implementations of the invention establish a uniform method for an identity claimant to obtain self-service access to an entire portfolio of backend systems, even when the customer's identifying information may be represented somewhat differently in these backend systems.

Embodiments of the invention improve the technology of identity proofing (e.g., preventing identity theft). Embodiments of the invention employ an unconventional arrangement of steps including: receiving, by a computer device, a request for a new online account for accessing data stored in an enterprise system; determining, by the computer device, an identity associated with the request; determining, by the computer device, a risk score for the request; determining, by the computer device, validation steps based on the risk score; and executing, by the computer device, the validation steps. The steps themselves are unconventional, and the combination of the steps is also unconventional. For example, in embodiments, the method includes determining a risk score for the request. This risk score is newly created information that does not exist in any system, and this new information is then used in subsequent steps in an unconventional manner.

To the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
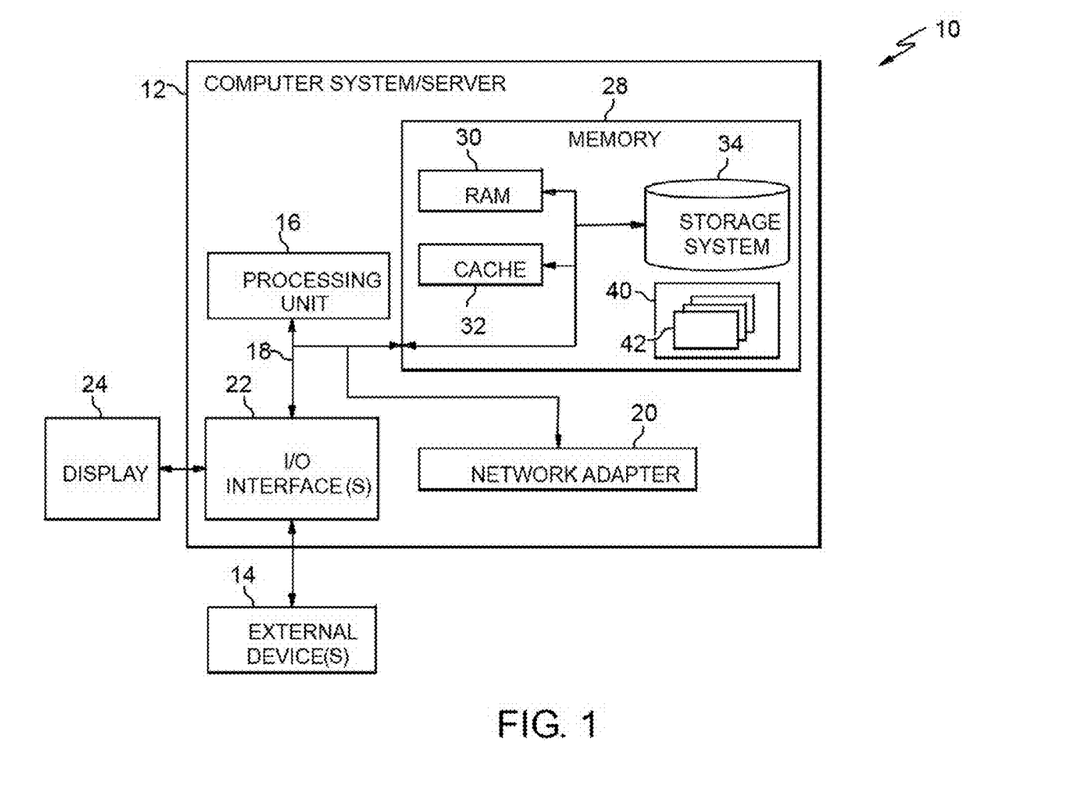
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
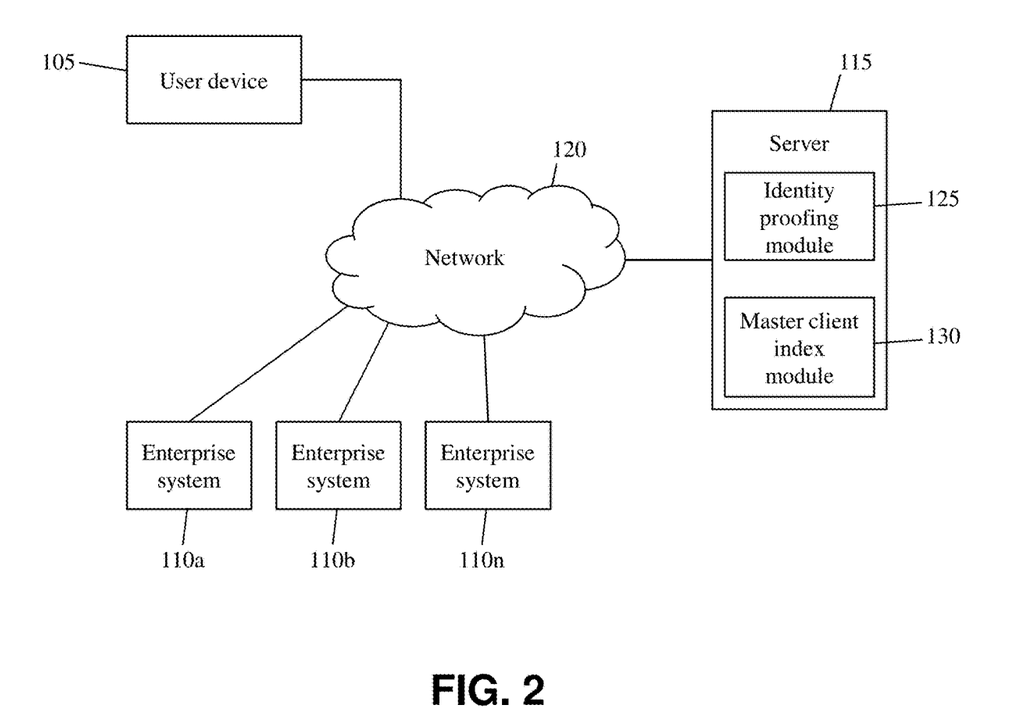
FIG. 2 shows a block diagram of an exemplary environment in accordance with aspects of the invention.

FIG. 2 shows a block diagram of an exemplary environment in accordance with aspects of the invention. In embodiments, the environment includes a user device 105, a server 115, and plural enterprise systems 110a, 110b, . . . , 110n. The user device 105 comprises a computer device such as a smartphone, tablet computer, desktop computer, laptop computer, etc., and may include one or more components of the computer system 12 of FIG. 1. The user device 105 is configured to provide network access to other computer devices (such as the server 115 and enterprise systems 110a-n) via one or more communication networks, which may be part of a network 120 shown in FIG. 2.

In embodiments, each of the enterprise systems 110a-n comprises at least one computer device that stores data associated with users of the respective enterprises. In one example, the enterprise system 110a is operated by a state department of motor vehicles and stores data about users who are registered with the department of motor vehicles, and the enterprise system 110b is operated by a state department of health and human services and stores data about users who are registered with the department of health and human services. In another example, the enterprise system 110a is operated by a financial institution and stores data about checking accounts that users have with the financial institution, the enterprise system 110b is operated by the financial institution and stores data about credit card accounts that users have with the financial institution, and the enterprise system 110b is operated by the financial institution and stores data about investment accounts that users have with the financial institution. In another example, the enterprise system 110a is operated by a service provider and stores data about cellular telephone accounts that users have with the service provider, and the enterprise system 110b is operated by the service provider and stores data about Internet access accounts that users have with the service provider. These examples are not intended to limit aspects of the invention, and there may be any number of enterprise systems 110a-n operated by any type of service providers that store any type of data associated with customers, users, clients, etc.

In embodiments, the server 115 comprises a computer device that includes one or more components of the computer system 12 of FIG. 1. In accordance with aspects of the invention, the server 115 includes an identity proofing module 125 and a master client index module 130 that are configured to perform one or more functions described herein. The identity proofing module 125 and the master client index module 130 each may include one or more program modules 42 as described with respect to FIG. 1.

In embodiments, separate modules of the server 115 may be integrated into a single module. Additionally, or alternatively, a single module of the server 115 may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the network 120 comprises one or more of a LAN, WAN, and the Internet. In a cloud embodiment, the network 120 comprises a cloud computing environment and the functions performed by the server 115 are provided as Software as a Service (SaaS). In the cloud embodiment, components of the server 115 may be distributed at different physical locations (e.g., nodes) in the cloud computing environment. In such a cloud implementation, one or more components of the server 115 may be duplicated at different physical locations (e.g., nodes) in the cloud computing environment, e.g., to provide redundancy.

In accordance with aspects of the invention, the identity proofing module 125 is configured to provide identity proofing functionality when a user requests a new online account to access data stored in one or more of the enterprise systems 110a-n. The user requesting a new online account is referred to as a claimant. To this end, the identity proofing module 125 is configured to make a determination as to whether to create a new online account for a claimant that employs the user device 105 to request online account access to data stored in one or more of the enterprise systems 110a-n. In embodiments, the identity proofing module 125 makes the determination by: determining an identity of the claimant; identifying the system (e.g., one or more of the enterprise systems 110a-n) for which access is requested; determining a risk score associated with the request; determining validation steps (e.g., challenge questions) based on the risk score; executing the validation steps; and analyzing the results of the validation steps. In embodiments, the identity proofing module 125 is configured to use machine learning to revise (i.e., optimize) the algorithms used in determining the validation steps. In embodiments, the identity proofing module 125 is configured to monitor account access, after creating the new online account, and determine when new validation steps should be implemented, e.g., due to a determined change in risk. Each of these steps is described in greater detail herein with respect to the flowcharts shown in the figures.

Figure 3:
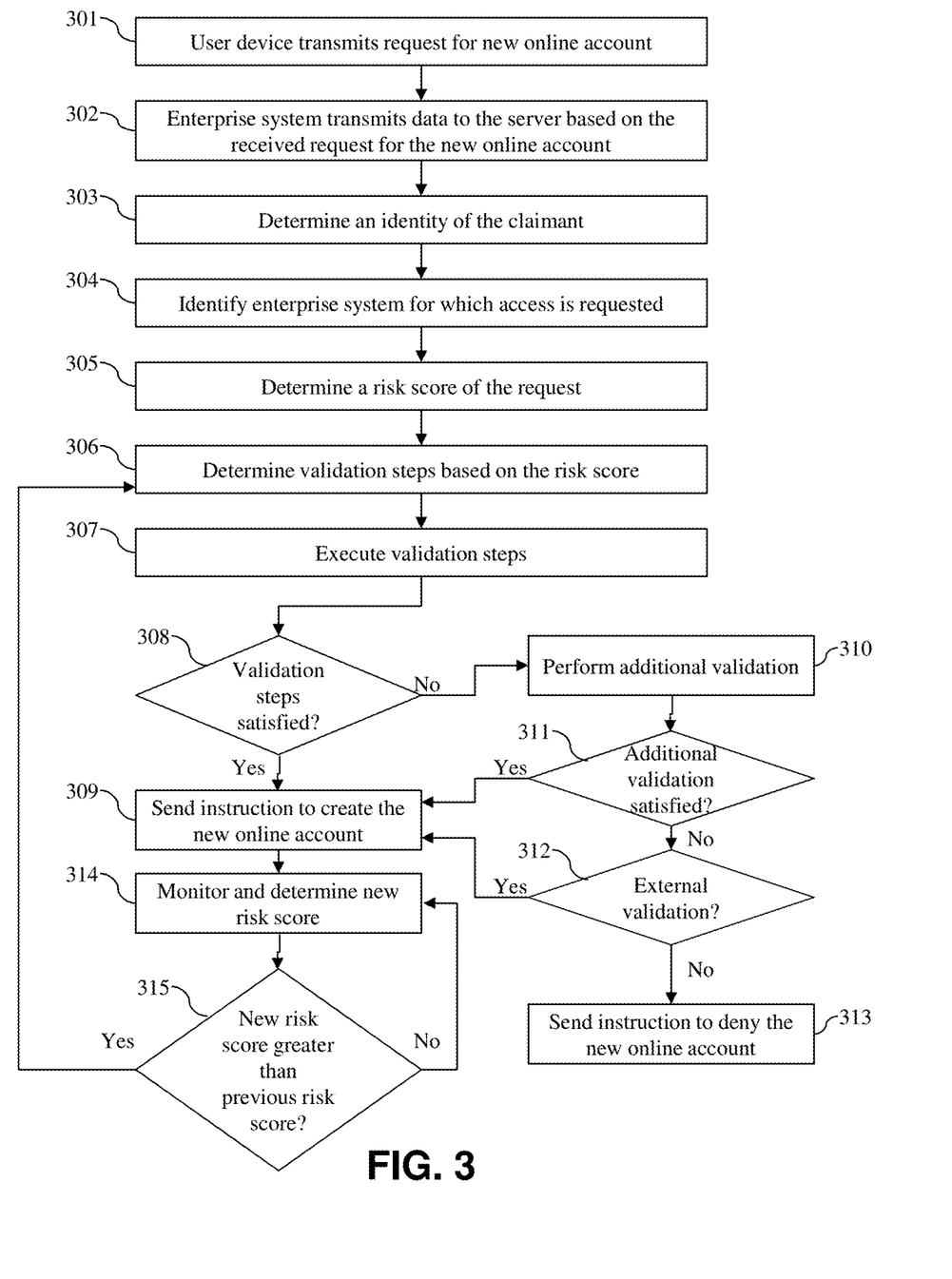
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2. The method is described using an exemplary use case in which the enterprise systems 110a-n store data defining plural different users' checking accounts, credit card accounts, and investment accounts, respectively; however, implementations of the method are not limited to this example, and embodiments can be used with other types of data for which online account access is sought.

At step 301, the user device 105 transmits data to one of the enterprise systems 110a-n requesting a new online account to access data stored in one or more of the enterprise systems 110a-n. In embodiments, the request is received via a web portal that is provided by the one of the enterprise systems 110a-n.

At step 302, the one of the enterprise systems 110a-n that received the request at step 301 transmits data associated with the request to the server 115. In embodiments, the data includes, for example, a MAC address of the user device 105, an IP address of the user device, and data defining the one of the enterprise systems 110a-n for which the new online account is being requested. Other data may also be included in the transmission from the one of the enterprise systems 110a-n to the server.

At step 303, the identity proofing module 125 determines an identity of the claimant that made the request at step 301. In implementations, the identity proofing module 125 first performs a validation that the claimant is a human user and not a computer (e.g., a bot). In one example, the identity proofing module 125 sends instructions to the user device 105 that cause the user device 105 to present a challenge-response test, such as a CAPTCHA (completely automated public Turing test to tell computers and humans apart). In the event that the challenge-response test is failed, then the new online account is denied and the process ends. In the event that the challenge-response test is passed (e.g., the claimant provides input to the user device 105 that satisfies the challenge-response test), then the identity proofing module 125 sends a request to the user device 105 for identification information of the claimant. The identification information may include any suitable information, such as at least one of: name of the person associated with the data for which access is being requested; social security number of the person associated with the data; telephone number of the person associated with the data; physical mailing address of the person associated with the data; email address of the person associated with the data; birthdate of the person associated with the data; and an account number associated with the data. These examples are non-limiting, and other types of identification information may be requested.

Still referring to step 303, in embodiments the identity proofing module 125 receives the requested identification information from the user device 105 and compares the received identification information to data stored in the master client index module 130 to determine whether the received identification information matches identification information stored in association with data in one or more of the enterprise systems 110a-n. In embodiments, each of the enterprise systems 110a-n stores identification information associated with its data. For example, when the enterprise system 110a stores data about checking accounts for different people, the enterprise system 110a also stores identification information associated with each of the respective people. Similarly, when the enterprise system 110*b* stores data about credit card accounts for different people, the enterprise system 110*a* also stores identification information associated with each of the respective people. In embodiments, the master client index module 130 aggregates all the identification information stored in the plural enterprise systems 110*a-n*, and the identity proofing module 125 compares the received identification information (received from the user device 105) to the aggregated identification information stored in the master client index module 130. Based on this comparison, the identity proofing module 125 determines whether the received identification information (received from the user device 105) corresponds to data stored in one or more of the enterprise systems 110*a-n*. In this manner, the identity proofing module 125 determines an identity of the claimant relative to data stored in at least one of the enterprise systems 110*a-n*.

In embodiments, step 303 includes the identity proofing module 125 determining whether there is only one single match (in the requested one of the enterprise systems 110*a-n*) for the received identification information. For example, if the received identification information (received from the user device 105) corresponds to data stored with one and only one checking account in the enterprise system 110*a*, then the identity proofing module 125 determines the identity of the claimant as that identity associated with the one checking account. On the other hand, if the received identification information corresponds to data stored with two or more separate checking accounts in the enterprise system 110*a*, then the identity proofing module 125 determines that there is more than one match for the received identification information. In this situation, the identity proofing module 125 sends a request to the user device 105 for additional identification information, receives the additional identification information from the user device 105, and compares the received additional identification information to the identification information stored in the master client index 130. If the combination of the received identification information and the received additional identification information corresponds to data stored with one and only one checking account in the enterprise system 110*a*, then the identity proofing module 125 determines the identity of the claimant as that identity associated with the one checking account. On the other hand, if the combination of the received identification information and the received additional identification information corresponds to data stored with two or more separate checking accounts in the enterprise system 110*a*, then the identity proofing module 125 determines that the identity of the claimant cannot be resolved, and sends data to the user device 105 informing the claimant that the new online account cannot be created and instructing the claimant to go in person to a location to provide physical identification information.

At step 304, the identity proofing module 125 identifies the one of the enterprise systems 110*a-n* for which access is being requested. In embodiments, the identity proofing module 125 compares the user request (from step 301) to the one of the enterprise systems 110*a-n* for which access is being requested.

Also at step 304, in embodiments the identity proofing module 125 uses a pre-defined rule-based system to determine an initial risk score associated with the access requested in the user request. In embodiments, the master client index module 130 stores data defining initial risk scores for the different data stored in the enterprise systems 110*a-n*. In embodiments, the initial risk scores are based on the type of data (stored in the enterprise systems 110*a-n*) and the type of access to the data (e.g., access to read the data, access to change the data, access to perform transactions with the data, etc.). For example, read only access to view stored driver's license account data may have a low initial risk score, read only access to view stored checking account data may have a medium initial risk score, and access to perform transactions with a checking account may have a high initial risk score. In embodiments, the respective initial risk scores are defined by an administrator of each of the enterprise systems 110*a-n* and stored in the master client index module 130 for quick access by the identity proofing module 125.

At step 305, the identity proofing module 125 determines an overall risk score for the request based on the initial risk score (from step 304) and one or more risk criteria. In embodiments, the risk criteria include at least one of: whether an online account has previously been requested for this data; a degree to which the system being accessed (or transactions executed) exceeds a pattern; a determined degree of fame and/or notoriety of the identity associated with the data and/or a person associated with the data. These described risk criteria are exemplary and non-limiting, and implementations of the invention may use one or more of these and/or other risk criteria.

As an example of one risk criteria, in embodiments the identity proofing module 125 is configured to determine whether an online account has previously been requested for this data. For example, if the identity of the claimant is John Doe (e.g., determined at step 303) and the request for access is a new online account for accessing a checking account defined by data stored at enterprise system 110*a* (e.g., determined at step 304), then the identity proofing module 125 analyzes past requests that have been made for this same account for this same identified person. In the event that there have been no previous requests for this same account for this same identified person, then the identity proofing module 125 does not add any amount to the initial risk score (i.e., this risk factor does not contribute any amount to the overall risk score). On the other hand, if there has been at least one previous requests for this same account for this same identified person, then the identity proofing module 125 analyzes one or more aspects of the at least one previous request to determine an amount to add to the initial risk score. Such aspects may include: location of the previous request (e.g., by comparing the IP address of the current request and the IP address of the previous request, and increasing the risk score if the locations of the IP addresses are different); computer device used to make the previous request (e.g., by comparing the MAC address of the current request and the MAC address of the previous request, and increasing the risk score if the addresses are different); a number of previous requests that have been made (e.g., an amount of increase of the risk score is proportional to the number of previous requests that have been made); and reasons for denial of the previous request. Data defining the previous requests may be stored at the server 115 for purposes of this analysis. Rules defining amounts to add to the initial risk score for different aspects may also be stored at the server 115 for purposes of this analysis.

As another example of risk criteria analyzed at step 305, in embodiments the identity proofing module 125 is configured to determine a degree to which the system being accessed (or transactions executed) exceeds a pattern. In embodiments, the identity proofing module 125 performs an Internet search for the name of the identified claimant (e.g., John Doe in this example), and compares the number of Internet search results for this name to an average number of Internet search results for plural other names. In embodiments, the identity proofing module 125 determines an amount to add to the initial risk score wherein the amount is proportional to a number of standard deviations by which the number of results for this name exceeds the average number of results for plural other names. In this manner, a name that receives more results compared to the average number of results will have an increased overall risk score due to a higher amount being added to the initial risk score, and vice versa for a name that has the same or less results compared to the average number of results. Rules defining amounts to add to the initial risk score (for contributing to the overall risk score) for different numbers of standard deviations away from the average may be stored at the server 115 for purposes of this analysis.

As another example of risk criteria analyzed at step 305, in embodiments the identity proofing module 125 is configured to determine a degree of fame and/or notoriety of the identity associated with the data and/or a person associated with the data. In embodiments, the identity proofing module 125 performs an Internet crawl for the name of the identified claimant (e.g., John Doe in this example), and determines a number of results for this name within a predefined recent time period (e.g., within the last week, the last month, etc.). In embodiments, a higher number of results within the predefined recent time period results in a higher amount being added to the initial risk score. In this manner, a name that has a higher frequency of Internet results (e.g., a higher number of results over the predefined recent time period) will have an increased overall risk score due to a higher amount being added to the initial risk score, and vice versa for a name that has a lower frequency of Internet results. Rules defining amounts to add to the initial risk score (for contributing to the overall risk score) for different numbers of results for this name within the predefined recent time period may be stored at the server 115 for purposes of this analysis.

In embodiments, the identity proofing module 125 determines the overall risk score by increasing or decreasing the initial risk score (from step 304) based on amounts determined using the one or more risk criteria, e.g., as described above. In aspects, each of the risk criteria is weighted such that each contributes to the overall risk score an amount proportional to its respective weighting. The weightings may be defined by a system administrator and stored in a data structure at (or accessible by) the server 115.

At step 306, the identity proofing module 125 determines validation steps (e.g., challenge questions) based on the risk score and using data stored in one or more of the enterprise systems 110a-n. In embodiments, the identity proofing module 125 determines a number of questions to present to the user of the user device 105 based on the overall risk score that was determined at step 304. Rules may be stored that define a number of questions to present based on different overall risk scores. For example, an exemplary rule may indicate that three questions are to be presented when the overall risk score falls within a first range, that four questions are to be presented when the overall risk score falls within a second range higher than the first range, and that five questions are to be presented when the overall risk score falls within a third range higher than the second range. This rule is non-limiting, and other rules may be used.

In accordance with aspects of the invention, the identity proofing module 125 generates the questions using data stored in one or more of the enterprise systems 110a-n. In embodiments, the identity proofing module 125 generates the questions based on data stored in the one of the enterprise systems 110a-n for which the new online account access is being requested. In an exemplary use case, the request is for a new online account to access a checking account stored in enterprise system 110a, and the enterprise system 110a stores data that defines the year the checking account was opened and the PIN associated with the ATM card. In this exemplary use case, the identity proofing module 125 may generate questions such as "what year did you open the checking account?" and "what is the PIN associated with the ATM card for this checking account?". These two examples of questions are non-limiting, but demonstrate the types of questions that can be generated based on data that is contained in the checking account for which online access is being sought.

In embodiments, the questions generated at step 306 are based on data stored in other ones of the enterprise systems 110a-n, for which the same identity (e.g., determined at step 303) is associated with the other data. In an exemplary use case, the request is for a new online account to access a checking account stored in enterprise system 110a and the identity is John Doe (e.g., determined at step 303), and the identity proofing module 125 determines whether the same identity (e.g., John Doe) is associated with data stored in one or more of the other enterprise systems 110b, 110n, etc. In this example, the identity proofing module 125 determines that this same identity (e.g., John Doe) is associated with data stored for a credit card account in enterprise system 110b. In this example, the enterprise system 110b stores data defining a number of cards that are issued for the credit card account and the card security code of the credit card. In this example, the identity proofing module 125 generates one or more questions (at step 306) based on this data from the credit card account in enterprise system 110b. For example, the identity proofing module 125 may generate questions such as "how many cards are issued for your credit card account?" and "what is the card security code of your credit card?". These two examples of questions are non-limiting, but demonstrate the types of questions that can be generated based on data that is contained in another account that is associated with the identified claimant.

In this manner, the identity proofing module 125 may generate challenge questions based on data from plural different data sources that are associated with the determined identity of the claimant. Accordingly, if the person using the user device 105 to make the account request is who they claim to be (i.e., they are in fact the person identified at step 303), then they should be able to answer these questions. Conversely, if the person using the user device 105 to make the account request is not who they claim to be (i.e., they are not the person identified at step 303), then they should not be able to answer these questions.

Still referring to step 306, in embodiments the identity proofing module 125 is configured to select a subset of challenge questions when a total number of available challenge questions exceeds the number of questions to present based on the overall risk score. For example, for a given overall risk score, if more questions can be generated for the identity claimant than are required for validation, then the identity proofing module 125 selects a subset of the questions that are the most likely to adjudicate the identity claimant. In embodiments, the subset of the available questions is selected based on a determined difficulty of each of the available questions. In embodiments, the difficulty of each question is determined based on historical average of all questions answered wrong by all claimants.

At step 307, the identity proofing module 125 executes the validation steps that were determined at step 306. In embodiments, the identity proofing module 125 transmits the determined challenge questions to the user device 105 and prompts the claimant (e.g., the user of the user device 105) to answer the challenge questions. Step 307 may include the identity proofing module 125 receiving the claimant's answers to the challenge questions, e.g., transmitted from the user device 105 to the server 115.

At step 308, the identity proofing module 125 determines whether the claimant satisfied the validation steps. In embodiments, the identity proofing module 125 determines whether the claimant correctly answered all the challenge questions that were presented to the claimant at step 307.

In the event that the claimant does satisfy the validation steps (i.e., the claimant correctly answered all of the challenge questions), then at step 309 the system creates the new online account (that was requested at step 301). In embodiments, the identity proofing module 125 sends instructions to the one of the enterprise systems for which the new online account was requested, the instructions indicating that the claimant's identity has been successfully verified. In response to receiving these instructions, the one of the enterprise systems for which the new online account was requested creates the new online account for this claimant and transmits credentials (e.g., username and password for the new online account) to the user device 105.

In the event that the claimant does not satisfy the validation steps (i.e., the claimant does not correctly answered all of the challenge questions), then at step 310 the identity proofing module 125 performs additional validation steps. In embodiments, the identity proofing module 125 sends at least one additional challenge question to the claimant, the at least one additional challenge question being based on data stored in one of the enterprise systems 110a-n and being different than the validation questions that were sent at step 307.

At step 311, the identity proofing module 125 determines whether the claimant satisfied the additional validation steps. In embodiments, the identity proofing module 125 determines whether the claimant correctly answered all the at least one additional challenge questions that were presented to the claimant at step 310. In the event the claimant satisfies the additional validation steps (i.e., the claimant correctly answers the at least one additional challenge question), then the process proceeds to step 309 as described above. In the event the claimant does not satisfy the additional validation steps (i.e., the claimant does not correctly answer the at least one additional challenge question), then the process proceeds to step 312 where external validation is requested.

At step 312, the identity proofing module 125 determines whether the identity can be external validated. In embodiments, the identity proofing module 125 determines a confidence score based on the claimant's answers to both the challenge questions (from step 307) and the at least one additional challenge question (from step 310). In embodiments, the confidence score is based on the number of questions that the claimant correctly answered versus the number of the questions that the claimant incorrectly answered, the determined difficulty of each question that the claimant correctly answered, and the determined difficulty of each question that the claimant incorrectly answered. Any desired formula may be used based on these parameters. In embodiments, a higher confidence score indicates a higher confidence that the claimant is who they claim to be, and a lower confidence score indicates a lower confidence that the claimant is who they claim.

In embodiments, at step 312, the identity proofing module 125 compares the determined confidence score to two threshold values, e.g., a low threshold and a high threshold. If the confidence score is lower than the low threshold then the process proceeds to step 313 described below. If the confidence score is between the low threshold and the high threshold, then the identity proofing module 125 attempts to validate the identity of the claimant by making a call to an external validation service, such as a credit rating bureau or a blockchain identification service. The call to the external validation service may include identification information received at step 302. In the event the external validation service verifies the identity of the claimant based on this call, then the process proceeds to step 309 (e.g., the new online account is created for the claimant). On the other hand, in the event the external validation service does not verify the identity of the claimant based on this call, then the process proceeds to step 313 described below.

At step 313, the identity proofing module 125 sends instructions to the one of the enterprise systems for which the new online account was requested, the instructions indicating that the claimant's identity cannot be verified. In embodiments, the one of the enterprise systems for which the new online account was requested sends a message to the user device 105, the message informing the claimant that the new online account will not be created because the identity cannot be verified. The message may further instruct the claimant on how to proceed, e.g., such as providing instructions for the claimant to perform physical verification.

At step 314, after the online account is created, the identity proofing module 125 monitors the risk criteria associated with the online account and determines a new risk score based on determined changes to the monitored risk criteria. Over time, one or more of the risk criteria associated with the online account might change. For example, one or more new requests for a new online account might be received for this same data and identity, even though the already created online account exists. In another example, the name of the identity associated with the account might become more prevalent in Internet searches and/or frequency of Internet search results. To account for these possible changes, in embodiments, the identity proofing module 125 monitors the risk criteria associated with the online account and determines when one or more of the risk criteria changes (e.g., relative to the state of the risk criteria analyzed previously at step 305). In response to determining that one or more of the risk criteria has changed, the identity proofing module 125 determines a new risk score for the online account. In embodiments, the new risk score is determined in the same manner as was performed at step 305, but using the changed risk criteria. In this manner, the new risk score reflects an updated risk score based on one or more updated risk criteria that have changed relative to the state of the risk criteria analyzed previously at step 305.

At step 315, the identity proofing module 125 determines whether the new risk score is greater than the previous risk score (from step 305). In the event the new risk score is not greater than the previous risk score, then the process loops back to step 314 where the identity proofing module 125 continues to monitor the risk criteria for changes. In the event the new risk score is greater than the previous risk score, then the process returns to step 306 where the identity proofing module 125 determines new validation steps based on the new risk score. The process then goes through steps 307 and 308 using the new validation steps (i.e., new challenge questions) based on the new risk score. In this aspect, step 309 comprises keeping the online account active when the user successfully answers the new challenge questions. Also in this aspect, step 313 comprises freezing the online account until the claimant shows up in person to provide physical proof of identity (e.g., a driver's license).

In embodiments, the identity proofing module 125 is configured to use machine learning to revise the algorithm(s) used in determining the validation steps at step 306. In embodiments, the machine learning is based on both correctly answered challenge questions (from at least one of step 308 and step 311) and incorrectly answered challenge questions (from at least one of step 308 and step 311) from plural different claimants. In a first example of machine learning, the identity proofing module 125 identifies challenge questions that satisfy two criteria: (i) claimants answered the question incorrectly a majority of the time, and (ii) the claimants eventually were validated using external validation services and/or physical validation. In this first example, questions that satisfy these two criteria are deemed to be too difficult and the identity proofing module 125 demotes these questions (and similar types of questions) in the algorithm(s) used in determining the validation steps at step 306 (i.e., are scored such that there is a decreased likelihood of this question and similar types of questions being presented in the future to another claimant).

In a second example of machine learning, the identity proofing module 125 identifies challenge questions that satisfy two criteria: (i) claimants answered the question incorrectly a majority of the time, and (ii) the claimants were not validated using external validation services and/or physical validation. In this second example, questions that satisfy these two criteria are deemed to be good indicators of identity fraud, and the identity proofing module 125 promotes these questions (and similar types of questions) in the algorithm(s) used in determining the validation steps at step 306 (i.e., are scored such that there is an increased likelihood of this question and similar types of questions being presented in the future to another claimant).

These two examples of machine learning are non-limiting, and implementations of the invention may utilize these and/or other types of machine learning. In embodiments, the machine learning is configured such that the identity proofing module 125 is optimized to reach a pass/fail decision with the fewest number of challenge questions for a particular claimant.

Figure 4:
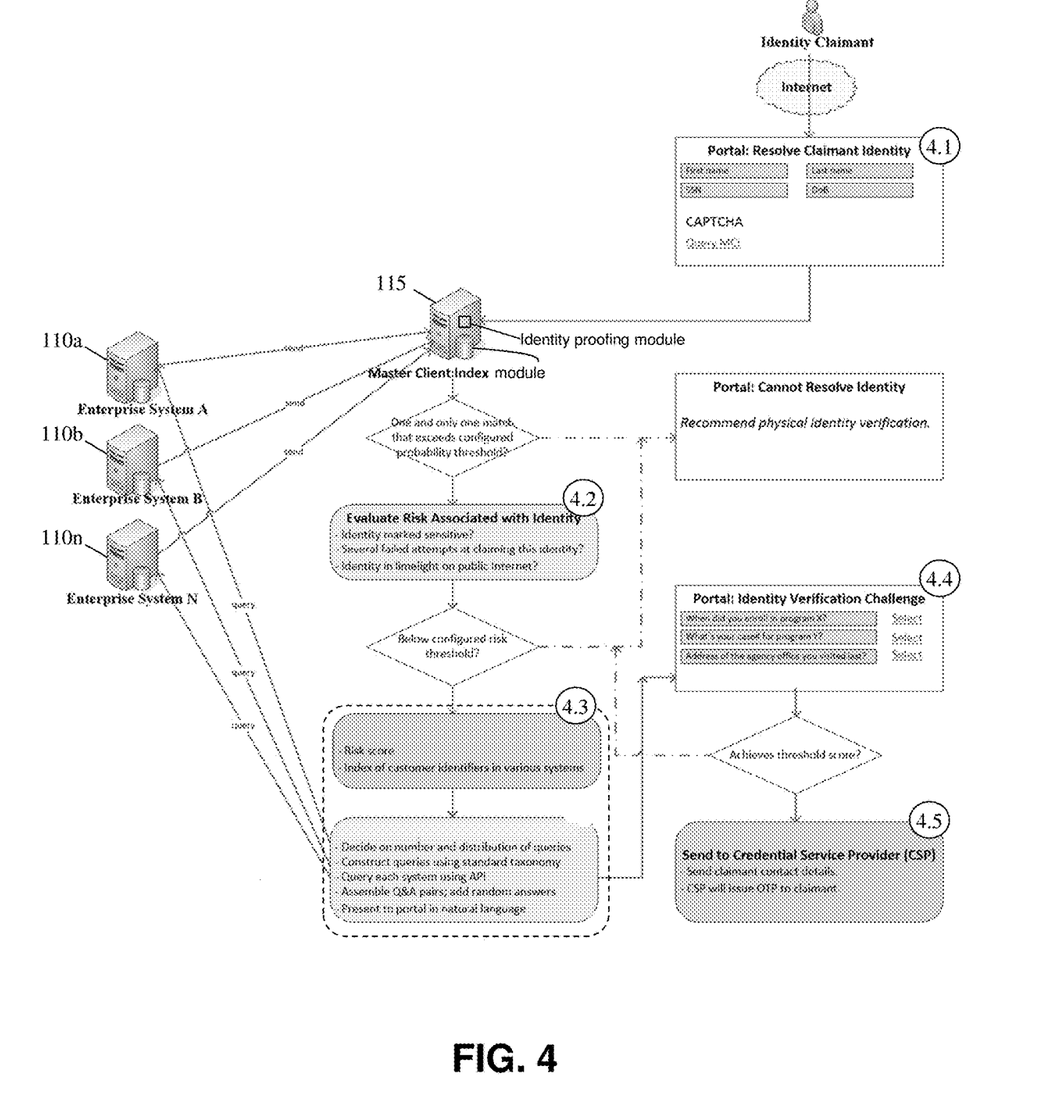
FIG. 4 shows a combined block diagram and flowchart illustrating an exemplary method in accordance with aspects of the invention.

FIG. 4 shows a combined block diagram and flowchart illustrating an exemplary method in accordance with aspects of the invention. The combined block diagram and flowchart is described with reference to elements depicted in FIG. 2 and steps depicted in FIG. 3.

At step 4.1, the system resolves the claimant identity. In embodiments, this is the first step in the identity proofing process. In this step, the identity claimant's potential identity is resolved against data in the master client index module 130. The identity claimant is first put through a CAPTCHA to ensure they are not a robotic operator. The identity claimant is then asked to provide their name, SSN and date of birth. The system then queries the master client index module 130 to resolve the identity. Only if one and only one identity is located, the system moves forward to the next step. Else, the identity claimant is referred for physical identity verification. Step 4.1 of FIG. 4 may comprise step 303 of FIG. 3.

At step 4.2, the system evaluates the risk associated with the identity. In embodiments, this is an extensible routine that performs a risk criteria based evaluation of the risk score for this request. In embodiments, the module is structured such that additional risk criteria can be easily incorporated going forward. One example risk criteria is whether the identity is marked as sensitive in one or more the enterprise systems 110a-n. Another example risk criteria is whether there have been several failed attempts at claiming this identity. As this method maintains a complete audit trail of the attempts to obtain a certain identity in the master client index module 130, the system can easily execute this rule by querying the audit trail. Another example risk criteria is whether this identity is in the limelight on the public Internet. For example, is this person a high-ranking government official or a celebrity, or involved in a high-profile course case? In embodiments, the system determines this through an Internet crawl. In embodiments, if the risk score is above a certain configured threshold, the identity claimant is referred for physical identity verification; else, the system moves forward by determining validation steps based on the risk score. Step 4.2 of FIG. 4 may comprise step 305 of FIG. 3.

At step 4.3, the system executes the identity verification. In embodiments, the identity proofing module 125 executes the following steps: based on the risk score, and the configured risk tolerance of the agency, it decides on the number and difficulty of questions that must be presented in the Q&A challenge; and the identity proofing module 125 then farms out requests for program data to various enterprise systems 110a-n, using the customer's identifier within that system. In embodiments, the request and response are standard data structures that follow the National Information Exchange Model (NIEM) taxonomy. In embodiments, the request hits RESTful API endpoints in the enterprise systems 110a-n. These APIs are able to return current program data for the requested customer identifier. In embodiments, this program data, as per the NIEM taxonomy, includes at least one of: Program activity; Facilities and locations; Referral information; Case supervisors and administrators; Case numbers; and Customer Identifiers.

Still referring to step 4.3, in embodiments, once the response is obtained, the identity proofing module 125 arranges the data in Q&A pairs. Because a standard taxonomy is used, data from multiple systems can be arranged consistently in Q&A pairs. Because the data is collected from several systems, the solution works even when the identity claimant has sparse data in some systems. Sometimes, the number of Q&A pairs may far exceed the number of questions required as per the risk score and risk tolerance. In that case, the identity proofing module 125 is configured to select questions that enhance the possibility of a quicker pass/fail. In embodiments, the identity proofing module 125 uses machine learning techniques and past performance data to determine the final set of questions. In embodiments, the optimization objective for the machine learning algorithms is a conclusive pass/fail decision with the least number of questions. In embodiments, after the final set of questions is determined, random but likely answers are added to the list, so the Q&A challenge may be presented to the identity claimant in a multiple choice format. Step 4.3 of FIG. 4 may comprise step 306 of FIG. 3.

At step 4.4, the system executes the Q&A Challenge. In embodiments, the identity proofing module 125 presents the challenge questions (from step 4.3) to the portal in natural language. All identity claimants must pass the Q&A challenge in order for the identity to be validated. In embodiments, the system may be configured for an additional identity verification, using an external validation services. In embodiments, the system is built such that external validation services can be easily added to further validate the identity claim. Whether or not to use these additional external validation services depends on the risk tolerance of the agency. Step 4.4 of FIG. 4 may comprise step 307 of FIG. 3.

At step 4.5, the system sends instructions to a Credential Service Provider. In embodiments, upon successful identity verification based on step 4.4, the following actions are performed. First, a username is created for the identity claimant, and linked to the master client index module 130. In embodiments, this step establishes a hard binding between the self-service account and the customer's identity in the enterprise. In embodiments, customer data requests from the portal to the back end systems are mediated through the master client index module 130. This mediation ensures that the self-service operator can only operate on his data, and not see or update someone else's, which is useful for HIPAA compliance. Second, a request is sent to the Credential Service Provider (CSP) to create the self-service account and relay the One Time Password (OTP) to the identity claimant. The account creation request is typically sent as a Service Provisioning Markup Language (SPML) message, that most current CSPs can understand and execute.

In light of the description herein, it is understood that embodiments of the invention provide a computer enabled system and method to identity proof an individual accessing one or more computer systems through the lifecycle of an accessible account, the method comprised of: management of a central access point to one or more related back-end systems; evaluating risk of improper access; and mediating risk with request for additional validation of the individual accessing one or more of the systems throughout the lifecycle of the central access point. The method may comprise an individual providing secure personal information to identify the access required in at least one back end system. The method may comprise risk identification related to level of sensitivity of the data, level of attempts at accessing the data, and existence of public information relating to the individual's information. The method may comprise modifying the risk rating subsequent to the original credentials being shared. The method may comprise suspending access to existing accounts until additional proof points are provided. The method may comprise mitigating risk via physical paper trail, un-repudiated digital credentials, or interactive questions from the system. The method may comprise storing the history of the access validation in a blockchain. The method may comprise storing the provided access credentials with a credential service provider.

In light of the description herein, it is understood that embodiments of the invention provide a method for authenticating an individual's identity throughout the lifecycle of an access point, the method comprising: receiving a request by a requester to access data associated with an individual in a computer system; determining an amount of risk associated with validating whether the requester is the same person as the individual; determining validation requirements for the requester based on the determined amount of risk; validating that the requester is the same person as the individual, based on the validation requirements, and in response, creating an account for the requester to access the data and providing the requester with credentials for accessing the data using the account; and after a period of time, determining that the amount of risk associated with validation has changed, and in response, locking the account, determining new validation requirements based on a new amount of risk, and requiring a new validation by the requester prior to unlocking the account. In embodiments, the amount of risk associated with validating whether the requester is the same person as the individual is based on: how sensitive the data is, whether access patterns for the data match standard access patterns, and/or whether the individual associated with the data is a public figure. In embodiments, the validation requirements include validation questions to be asked of the requester, and where determining the validation requirements includes determining a number and difficulty of the questions to be asked based on the determined amount of risk.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a computer device, a request from a device of a claimant for a new online account for accessing data stored in an enterprise system having a portfolio of accounts;

determining, by the computer device, an identity associated with the request;

determining, by the computer device, a risk score for the request based on risk criteria associated with the request, wherein the risk criteria include a degree to which the enterprise system being accessed exceeds a pattern determined by performing an Internet search for a name of the claimant;

determining, by the computer device, validation steps comprising challenge questions based on the risk score using algorithms;

revising, by the computer device, the algorithms used in determining the validation steps using machine learning;

executing, by the computer device, the validation steps;

determining, by the computer device, based on the executing the validation steps, that the validation steps have not been satisfied;

denying, by the computer device, the request from the device of the claimant for the new online account by sending an instruction to the enterprise system indicating that the identity associated with the request cannot be validated based on the validation steps having not been satisfied;

suspending network access of the device of the claimant to the portfolio of accounts in the enterprise system;

determining, by the computer device, a confidence score based on the validation steps and whether the confidence score is between a first threshold value and a second threshold value, the first threshold value being lower than the second threshold value; and in response to the confidence score being between the first threshold value and the second threshold value, transmitting a call to an external validation service to verify the identity associated with the request, the external validation service being communicatively connected to the computer device.

2. The method of claim 1, wherein the risk score comprises an overall risk score that is determined based on an initial risk score associated with the request and the risk criteria associated with the request.

3. The method of claim 2, wherein the risk criteria associated with the request further include whether an online account has previously been requested for the data; and a determined degree of notoriety of the identity.

4. The method of claim 1, wherein
the executing the validation steps comprises presenting the challenge questions to the claimant who made the request.

5. The method of claim 4, wherein the determining the validation steps comprises determining a number of the challenge questions to present to the claimant.

6. The method of claim 4, wherein the challenge questions are determined based on the data stored in the enterprise system.

7. The method of claim 4, wherein the challenge questions are determined based on other data stored in another enterprise system, the other data being associated with the determined identity.

8. The method of claim 4, wherein the machine learning is based on challenge questions from plural different claimants.

9. The method of claim 1, further comprising:
monitoring risk criteria associated with the new online account;
determining a new risk score after the new online account has been created based on determined changes to the risk criteria associated with the new online account;
determining the new risk score is greater than the risk score;
determining new validation steps based on the new risk score; and
executing the new validation steps.

10. The method of claim 1, further comprising:
sending a message to the device of the claimant with instructions to perform physical verification.

11. The method of claim 1, wherein the external validation service comprises
at least one selected from the group consisting of: a credit rating bureau; and a blockchain identification service.

12. A computer program product, the computer program product comprising a computer readable storage medium having program instructions embodied therewith, the program instructions executable by a computer device to cause the computer device to:
receive a request from a claimant for a new online account for accessing data stored in an enterprise system;
determine an identity associated with the request;
determine a risk score for the request, wherein the risk score comprises an overall risk score that is determined based on an initial risk score associated with the request and risk criteria associated with the request, wherein the risk criteria include a degree to which the enterprise system being accessed exceeds a pattern determined by performing an Internet search for a name of the claimant and comparing a number of Internet search results for the name to an average number of Internet search results for plural other names;
determine validation steps based on the risk score using algorithms;
revise the algorithms using machine learning;
execute the validation steps;
determine, based on the executing the validation steps, that the validation is satisfied;
grant the request from the claimant for the new online account by creating a username and establishing a binding between the claimant and a customer identity at the enterprise system;
establish a barrier to protect claimant data and the customer identity from other users of the enterprise system; and
send a one-time password to the claimant.

13. The computer program product of claim 12, wherein the risk criteria are selected from the group consisting of: whether an online account has previously been requested for the data; a degree to which the enterprise system being accessed exceeds a pattern; and a determined degree of notoriety of the identity.

14. The computer program product of claim 12, wherein:
the validation steps comprise challenge questions;
the determining the validation steps comprises determining a number of the challenge questions to present to the claimant who made the request; and
the executing the validation steps comprises presenting the challenge questions to the claimant.

15. The computer program product of claim 14, wherein the challenge questions are determined based on at least one selected from the group consisting of: the data stored in the enterprise system; and other data stored in another enterprise system, the other data being associated with the determined identity.

16. The computer program product of claim 14, wherein the machine learning is based on both correctly answered challenge questions and incorrectly answered challenge questions from plural different claimants.

17. The computer program product of claim 12, wherein the program instructions cause the computer device to:
determine a new risk score after the new online account has been created;
determine the new risk score is greater than the risk score;
determine new validation steps based on the new risk score; and
execute the new validation steps.

18. A system comprising:
a processor, a computer readable memory, and a computer readable storage medium;
program instructions to receive a request for a new online account for accessing data stored in an enterprise system;
program instructions to determine an identity associated with the request;
program instructions to determine a risk score for the request, wherein the risk score comprises an overall risk score that is determined based on an initial risk score associated with the request and risk criteria associated with the request, wherein:
 the risk criteria include a degree to which the enterprise system being accessed exceeds a pattern determined by performing an Internet search for a name of a claimant and comparing a number of Internet search results for the name to an average number of Internet search results for plural other names, and
 the risk criteria include a determined degree of notoriety of the identity that is determined by an Internet crawl for the name of the claimant and a number of results for the name within a predefined time period;
program instructions to determine validation steps based on the risk score using algorithms;
program instructions to revise the algorithms using machine learning;
program instructions to execute the validation steps;
program instructions to determine, based on the executing the validation steps, that the validation is satisfied;
program instructions to grant the request from the claimant for the new online account by creating a username and establishing a binding between the claimant and a customer identity at the enterprise system;
program instructions to establish a barrier to protect claimant data and the customer identity from other users of the enterprise system; and
program instructions to send a one-time password to the claimant,
wherein the program instructions are stored on the computer readable storage medium for execution by the processor via the computer readable memory.

19. The system of claim 18, wherein the program instructions to revise the algorithms using machine learning comprises:
identifying at least one challenge question of a plurality of challenge questions that plural claimants answered incorrectly for a predetermined threshold, wherein the plural claimants were validated using external validation; and
decreasing the risk score of the at least one challenge question to reduce a likelihood of the at least one challenge question being presented.

20. The computer program product of claim 12, wherein the establishing the barrier to protect claimant data and the customer identity from other users of the enterprise system is mediated using a master client index module to ensure that the claimant can only operate on the claimant data.

* * * * *